United States Patent
Fukuda

(10) Patent No.: US 6,668,854 B2
(45) Date of Patent: Dec. 30, 2003

(54) POPPET VALVE WITH HEATER

(75) Inventor: Mamoru Fukuda, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 10/277,831

(22) Filed: Oct. 23, 2002

(65) Prior Publication Data

US 2003/0116193 A1 Jun. 26, 2003

(30) Foreign Application Priority Data

Dec. 25, 2001 (JP) ........................................ 2001-392028

(51) Int. Cl.⁷ .............................................. F16K 49/00
(52) U.S. Cl. ...................... 137/341; 137/338; 251/63.5; 251/335.3
(58) Field of Search ................................ 137/341, 338; 251/335.3, 63.5

(56) References Cited

U.S. PATENT DOCUMENTS

| | | | | |
|---|---|---|---|---|
| 3,110,319 A | * | 11/1963 | Arata et al. | ................. 137/341 |
| 5,678,595 A | * | 10/1997 | Iwabuchi | ..................... 137/341 |
| 5,755,255 A | * | 5/1998 | Iwabuchi | ..................... 137/341 |
| 5,915,410 A | * | 6/1999 | Zajac | ........................ 137/341 |
| 6,321,780 B1 | * | 11/2001 | Iwabuchi | ..................... 137/341 |

FOREIGN PATENT DOCUMENTS

| | | |
|---|---|---|
| JP | 11-82807 | 3/1999 |
| JP | 3005449 | 11/1999 |
| JP | 3012831 | 12/1999 |

* cited by examiner

*Primary Examiner*—A. Michael Chambers
(74) *Attorney, Agent, or Firm*—Oblon, Spivak, McClelland, Maier & Neustadt, P.C.

(57) ABSTRACT

To allow the whole outer peripheral face of a casing of a poppet valve to be heated efficiently using an inexpensive rod-like heater. A heat transfer cover 30 formed of heat transfer material is provided in a covering manner on an outer peripheral face of a valve casing 10 comprising main ports 11, 12, a flow path 14 connecting these main ports 11, 12, an annular valve seat 15 provided in the flow path 14, a valve member 13 of a poppet type opening/closing the valve seat 15 and a rod 16 coupled to the valve member 13 so as to surround the whole periphery of the valve casing 10, and a rod-like first heater 32 is attached in a heater hole 31 provided in the heat transfer cover 30.

12 Claims, 6 Drawing Sheets

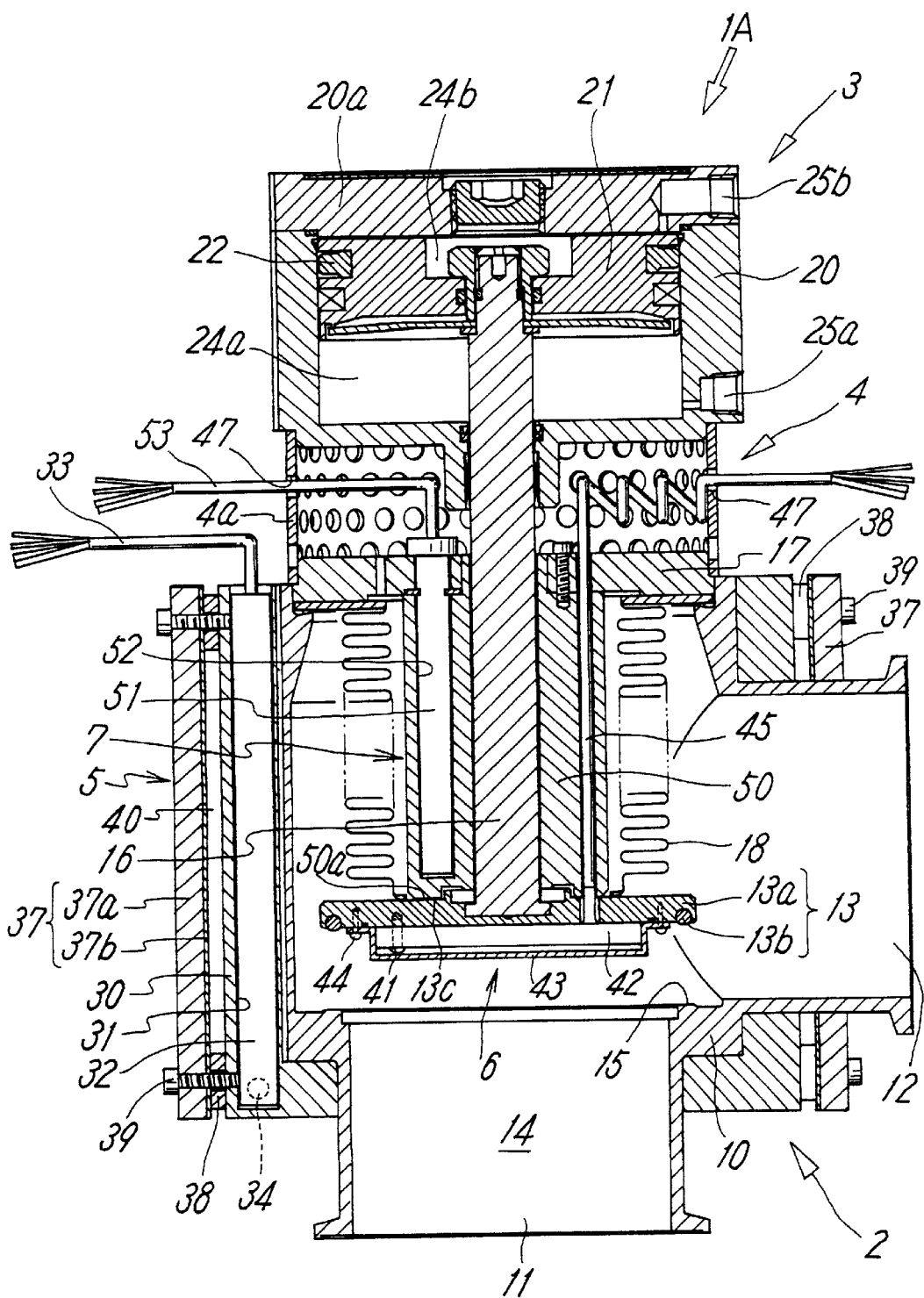
[Fig. 1]

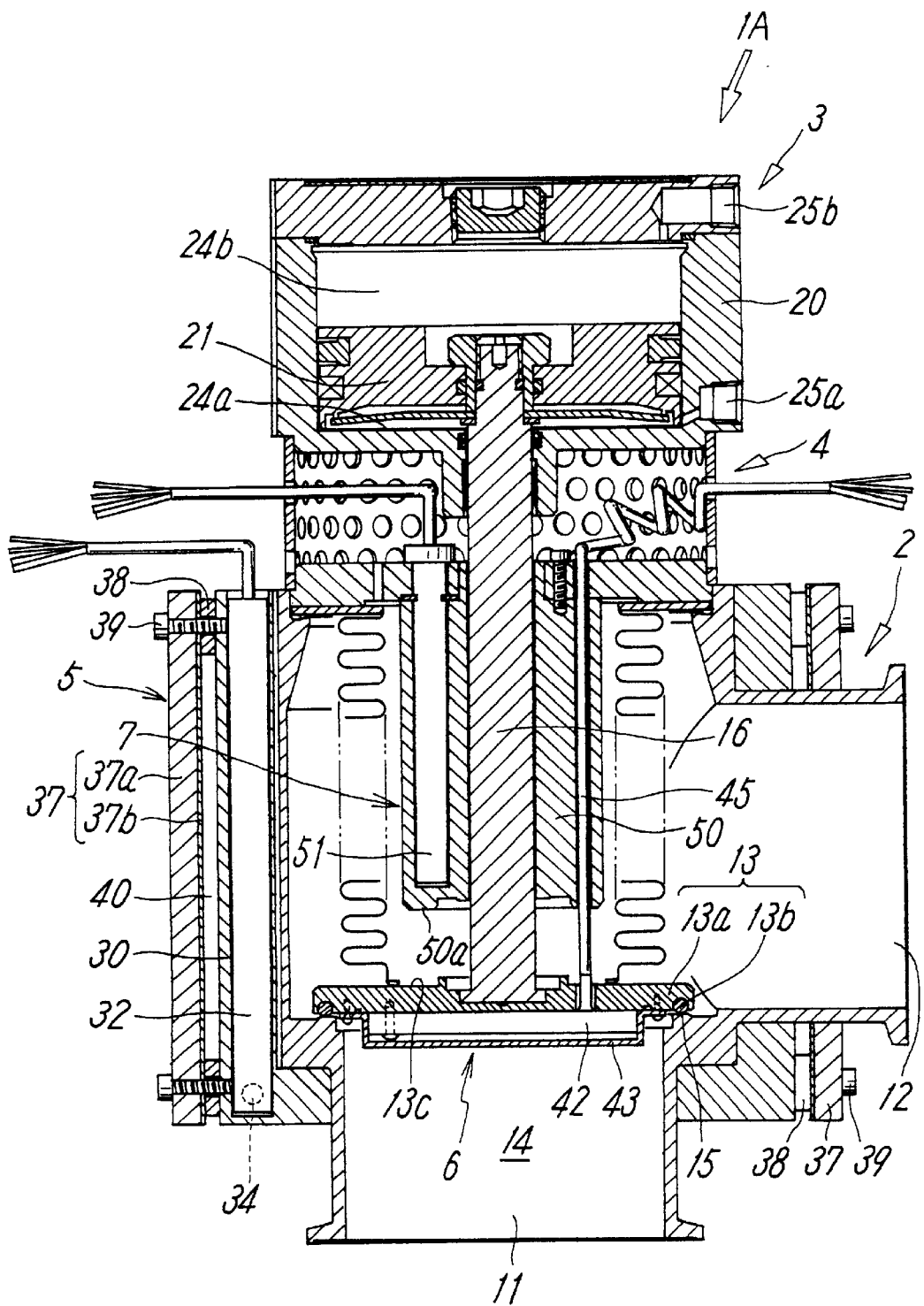
[Fig. 2]

[Fig. 3]
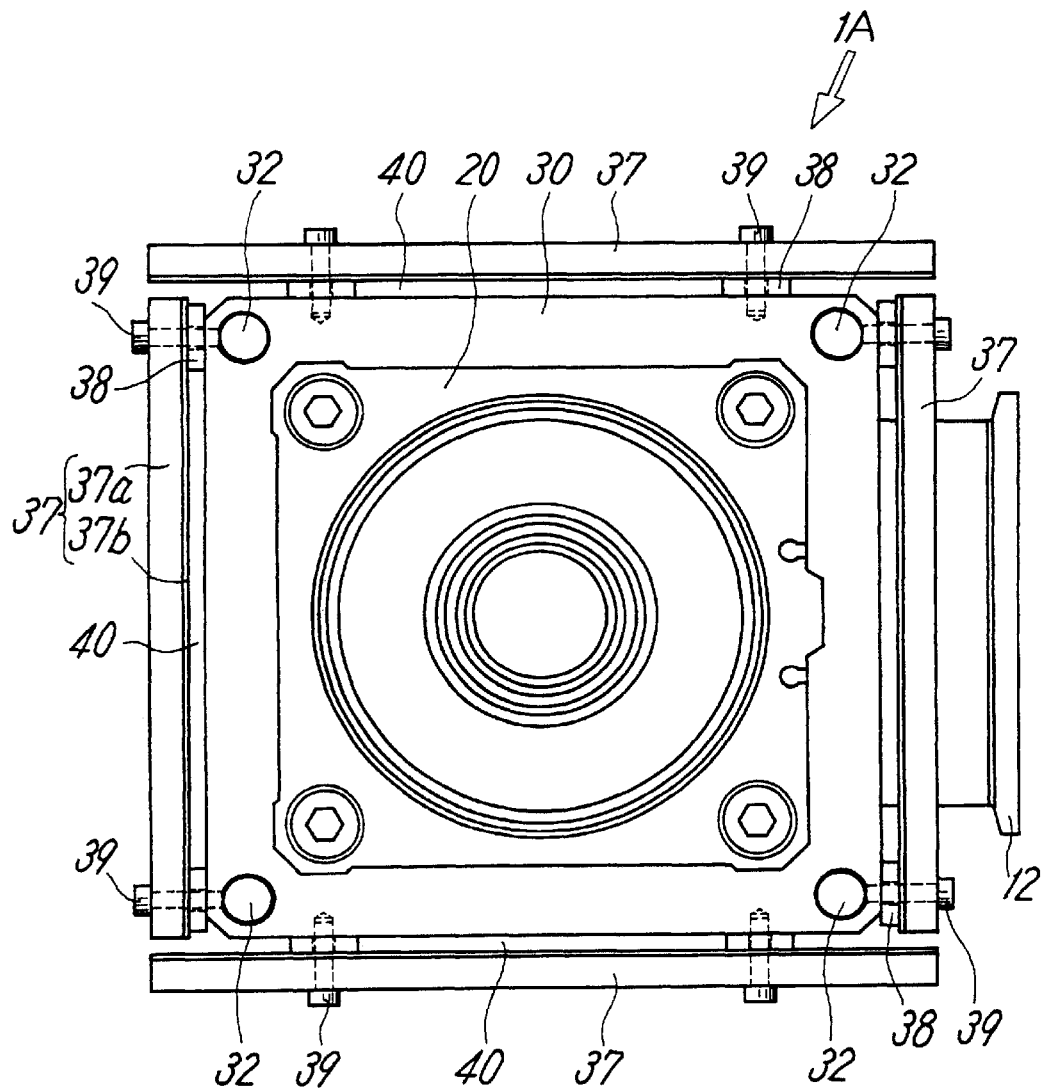

[Fig. 4]
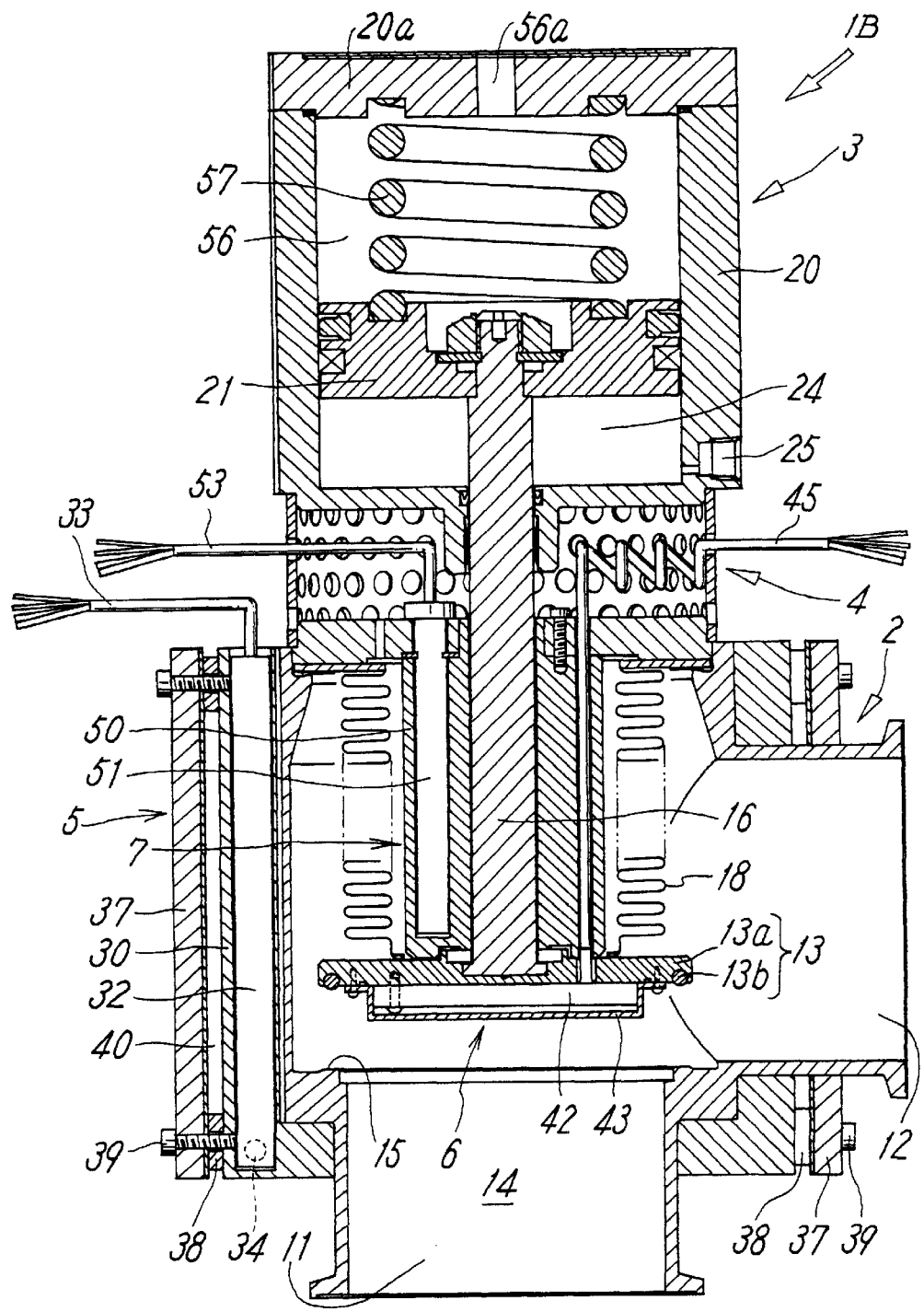

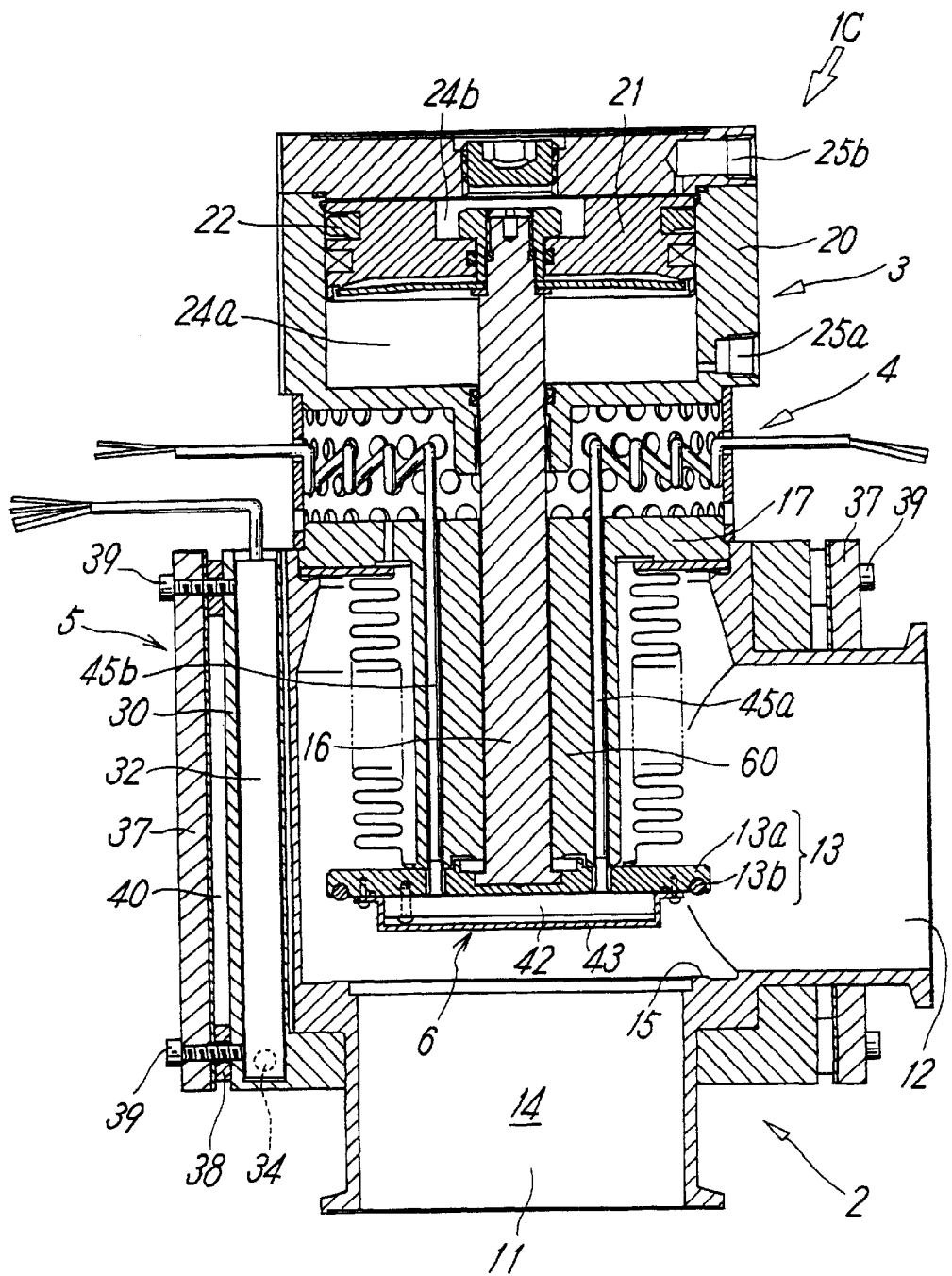
[Fig. 5]

[Fig. 6]
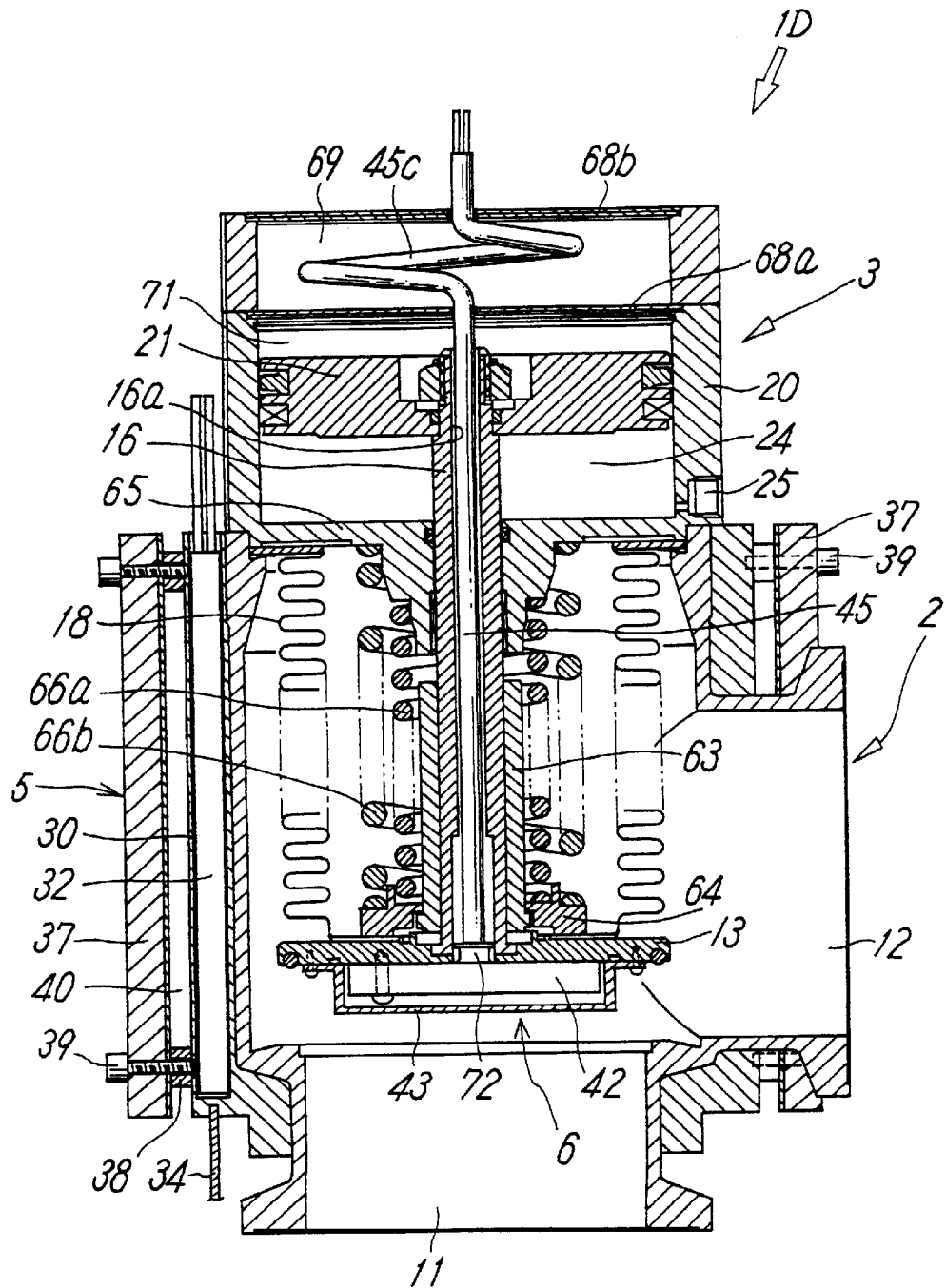

POPPET VALVE WITH HEATER

TECHNICAL FIELD TO WHICH THE INVENTION BELONGS

The present invention relates to a poppet valve which is directly used for supplying working fluid such as reaction gas or the like in physical and/or chemical machines or the like or which is used for pressure reduction of a vacuum chamber using such reaction gas or the like. More specifically, the present invention relates to a poppet valve with a heater which is constituted so as to prevent product from the working fluid from adhering to a valve member or the like by a heater.

PRIOR ART

In a manufacturing apparatus for semiconductors, for example, reaction gas with a high temperature is used for such a chemical processing as an etching which is transferred in a vacuum chamber, and a poppet valve is used for supplying the reaction gas or reducing pressure in the vacuum chamber. However, when the temperature of the reaction gas is lowered, the product is easy to deposit and the product adheres to the interior of a poppet valve or a valve member to lower an opening/closing accuracy of the valve. Therefore, in such a poppet valve, it is important that such a constitution is employed that deposition of product from the working fluid or adhesion thereof to the valve member and the like can be prevented.

For this reason, a various kinds of poppet valves with a heater which heats a casing, a valve member and the like by a heater to prevent adhesion of product have conventionally been proposed. In Japanese Patent No. 3005449 publication, there has been disclosed one where a band heater is wound on an outer face of a casing and a rod-shape heater is attached to a valve member for opening/closing a flow path through the interior of a hollow rod extending from the valve member. Also, in Japanese Patent No. 3012831, there has been disclosed one where a rubber heater is attached to an outer face of a casing and anther heater is attached an outer periphery of a cylindrical holding body integral with a valve member. Further, in JP-A 11-82807 publication, there has been disclosed one where a rubber heater is attached to an outer face of a casing and a flexible heater is housed in the interior of a hollow rod integral with a valve member.

In each of such conventional poppet valves, a flexible band heater or rubber heater is used as a heater for heating an outer face of the casing and this heater is wound on the outer face of the casing.

However, since these heaters are each formed by embedding a heat generating body such as a nichrome wire or the like in a thin and flexible insulating outer skin such as a silicon rubber, they are relatively expensive. In addition, since winding the heat generating body on the outer peripheral face of the casing means winding the heat generating body on the entire periphery of the casing without a gap, the length of the heat generating body becomes long, which results in excessive increase in power consumption. Also, when the heat generating body is broken, only this broken heat generating body can not be replaced with a new one and the whole heater including the outer skin must be replaced with a new one.

DISCLOSURE OF THE INVENTION

A technical object of the present invention is to allow the entire outer periphery of a casing of a poppet valve to be heated efficiently using an inexpensive rod-like heater.

In order to solve the above problem, a poppet valve with a heater of the present invention comprises: a valve casing which has a first main port and a second main port, a flow path connecting both the main ports and an annular valve seat provided in the flow path; a cylinder which is coupled to the valve casing; a valve member of a poppet type which is provided inside the valve casing to open/close the valve seat; a rod whose distal end portion is coupled to the valve member and whose proximal end portion extends into the interior of the cylinder; a piston which is slidably arranged in the interior of the cylinder via a sealing member and is coupled to the proximal end of the rod; a heat transfer cover which is made of heat transfer material and which covers an outer peripheral face of the valve casing so as to surround the whole valve casing; and one or more first heaters formed in a rod shape, which are built in the heat transfer cover.

According to the poppet valve of the present invention which has the above-described constitution, since the heat transfer cover is covered on the outer peripheral face of the valve casing and the rod-like first heater is built in the heat transfer cover, heat from the first heater is distributed uniformly and transferred on the whole outer peripheral face of the valve casing through the heat transfer cover. As a result, the whole outer peripheral face of the valve casing can efficiently be heated by the inexpensive rod-like heater via the heat transfer cover.

It is preferable that the heat transfer cover is formed of lightweight aluminum which is excellent in heat conductivity.

In the present invention, a heat insulating cover can be disposed on an outer face of the heat transfer cover in order to prevent heat transfer to the outside. It is preferable that the heat insulating cover has a constitution that a heat diffusing plate for diffusing heat from the heat transfer cover has been attached to an inner face of the heat insulating plate, and the heat insulating cover is attached to the heat transfer cover in a state where a constant gap has been maintained by interposing a spacer between the heat transfer cover and the heat insulating cover. It is preferable that the heat insulating plate is formed of fluoric rubber or fluoric rubber foam.

Also, in the present invention, one or more second heaters can be attached to the valve member. It is preferable that the second heaters are attached to a portion of a front face of the valve member which is positioned in an internal hole of the valve seat to face the flow path at a time of valve closing, and it is covered with a heater cover air-tightly.

Further, in the present invention, a heat transfer body provided at its distal end with a heat transfer face with which the valve member comes in contact at a valve opening position is disposed in the interior of the valve casing, and one or more third heater are attached to the heat transfer body. It is preferable that the heat transfer body is formed in a cylindrical shape and it is disposed about the rod concentrically therewith, and the third heater is accommodated in a heater hole provided in the heat transfer body.

The valve casing and the cylinder can be coupled to each other via a heat insulating portion for preventing heat transfer from the valve casing to the cylinder.

BRIEF DESCRIPTION OF THE DRAWINGS

FIG. 1 is a sectional view showing a first embodiment of the present invention in a state of valve opening.

FIG. 2 is a sectional view showing the first embodiment in a state of valve closing.

FIG. 3 is a plan view.

FIG. 4 is a sectional view showing a second embodiment of the present invention in a state of valve opening.

FIG. 5 is a sectional view showing a third embodiment of the present invention in a state of valve opening.

FIG. 6 is a sectional view showing a fourth embodiment of the present invention in a state of valve opening.

DETAILED DESCRIPTION

From FIG. 1 to FIG. 3 show a first embodiment of a poppet valve with a heater according to the present invention. This poppet valve 1A is suitable for use in pressure reduction of a vacuum chamber in a semiconductor manufacturing apparatus, and it comprises a valve opening/closing portion 2 which opens/closes a flow path 14 by a valve member 13, a cylinder operating portion 3 which drives the valve member 13, and a heat insulating portion 4 which is interposed between the valve opening/closing portion 2 and the cylinder operating portion 3. Three sets of first to third heating mechanisms 5, 6, 7 are provided in the valve opening/closing portion 2.

The valve opening/closing portion 2 has a square column-shaped valve casing 10 which is made of such material as stainless steel (SUS) or the like. This valve casing 10 comprises a first main port 11 for connection to either one of the vacuum chamber and a vacuum pump and a second main port 12 for connection to the other thereof, which are oriented in directions different from each other by 90°, and it also comprises the flow path 14 which connects both the main ports 11, 12 and an annular valve seat 15 provided in the flow path 14.

The valve member 13 of a poppet type that opens/closes the valve seat 15 is provided in the interior of the valve casing 10. This valve member 13 is formed by attaching a rubber-made sealing member 13b approaching to/separating from the valve seat 15 on a lower face outer periphery of a disc-shaped base member 13a, and a distal end portion of a rod 16 for driving is attached to a central portion of a back face of the valve member 13. A proximal end portion of the rod 16 penetrates a partition wall 17 of an end portion of the valve casing 10 and the heat insulating portion 4 to extend up to the cylinder operating portion 3 and be coupled to a piston 21. Also, an extensible bellows 18 is attached between a back face of the valve member 13 and the partition wall 17 so as to surround the rod 16.

On the other hand, the cylinder operating portion 3 has a cylinder 20 coupled to one end portion of the valve casing 10 via the heat insulating portion 4. The piston 21 is slidably accommodated in the interior of the cylinder 20 via a sealing member 22, a first pressure chamber 24a and a second pressure chamber 24b are formed on both sides of the piston 21, and these pressure chambers 24a, 24b are respectively connected to a first operation port 25a and a second operation port 25b which are opened on a side face of the cylinder 20. In the figure, reference numeral 20a denotes a cylinder cover which closes an end portion of the cylinder 20.

Then, when pressure fluid such as compressed air or the like is supplied form the first operation port 25a into the first pressure chamber 24a, as shown in FIG. 1, the piston 21 and the rod 16 retract so that the valve member 13 at the distal end of the rod 16 also retracts to open the valve seat 15. Also, when the first operation port 25a is opened and pressure fluid is supplied from the second operation port 25b into the second pressure chamber 24b, as shown in FIG. 2, the piston 21 and the rod 16 advance, so that the valve member 13 abuts on the valve seat 15 to close the valve seat 15.

The first heating mechanism 5 is attached to an outer surface of the valve casing 10 and it is constituted in the following manner. That is, this first heating mechanism 5 has a square column-shaped heat transfer cover 30 attached so as to surround the whole outer peripheral surface of the valve casing 10. This heat transfer cover 30 is formed of hard material which is excellent in heat conductivity, such as aluminum, to has a thickness to some extent, and it is attached to come in close contact with an outer surface of the valve casing 10. This heat transfer cover 30 may be wholly formed in one body, and it may be formed by combining a plurality of portions, for example, portions obtained by division to respective four side faces of the valve casing 10.

A plurality of heater holes 31 are bored in the thickness of the heat transfer cover 30 in parallel with an axial line of the valve casing 10, rod-shaped first heaters 32 are inserted into the respective heater holes 31 one by one. Then, heat from these first heaters 32 is distributed uniformly through the heat transfer cover 30 and transferred uniformly to the whole valve casing 10. In the figure, reference numeral 33 denotes a lead wire extending from the first heater 32, which are connected to an unillustrated heater control circuit.

Also, at least one of the first heaters 32 is attached with a temperature sensor 34 and the heat generating temperature of the first heater 32 is controlled by the heater control circuit according to a detection signal from the temperature sensor 34. A lead wire of the temperature sensor 34 is derived to the outside together with the lead wire 33 of the first heater 32. Incidentally, the temperature sensor 34 may be provided on the heat transfer cover 30 instead of the first heater 32.

In the illustrated embodiment, the first heaters 32 are provided at four corners of the heat transfer cover 30, but arrangement positions thereof may be central portions of respective side faces of the heat transfer cover 30, or they may be proper positions. Also, the number of the first heaters 32 is not limited to four, but it may be three or less, or it may be five or more. Alternately, only one first heater may be provided depending on the heating conditions. Incidentally, in case that a plurality of first heaters 32 are provided, it is preferable that the heaters are arranged at equal intervals as far as possible such that heat generation is easily distributed uniformly through the heat transfer cover 30.

The rod-like first heater 32 can be formed, for example, by accommodating an electric resistance heat generating body such as a nichrome wire or the like in a metal-made outer cylinder which is excellent in heat conductivity in an electrically insulating state, but it may be constituted in another manner.

Heat insulating covers 37 for preventing heat transfer from respective side faces of the heat transfer cover 30 are provided on outsides of the respective side faces in a covering manner. The heat insulating cover 37 is formed by attaching a thin heat diffusing plate 37b having a function diffusing heat from the heat transfer cover 30 to an inner side face of a plate-like heat insulating plate 37a formed of a silicon rubber, fluoric rubber, fluoric rubber foam or the like, and it is fixed to each side face of the heat transfer cover 30 by screws 39 in a state that a constant clearance 40 has been maintained by interposing spacers 38 between the heat transfer cover 30 and the heat insulating cover. In this case, it is preferable that some screws 39 for the heat insulating cover 37 are utilized for fixing the first heater 32 by causing distal ends of the screws to abut on the first heater 32.

The heat diffusing plate 37b can be formed of heat transfer material such as aluminum or the like, but it may be formed of another material. Also, in the illustrated embodiment, the heat insulating covers 37 comprises four pieces separated from each other but they may be wholly formed in one piece. Alternately, two heat insulating covers 37, 37 adjacent to each other may be integrated in one piece.

Since the first heating mechanism 5 has such a constitution, heat generation from the respective first heater 32 conducts to the heat transfer cover 30 to uniformly distribute on the whole cover so that heat it is transferred to the whole outer peripheral face of the valve casing 10 uniformly. As a result, even when the valve casing 10 is formed of material which is poor in heat conductivity, such as SUS, the whole outer peripheral face thereof can efficiently be heated by the inexpensive rod-like heaters 32 via the heat transfer cover 30.

Also, since the outer face of the heat transfer cover 30 is surrounded by the heat insulating cover 37, there is not a risk that heat from the heat transfer cover 30 conducts to a peripheral equipment, the human body or the like, and safety is high. In this case, further, since the heat diffusing plate 37b is attached to the heat insulating cover 37, even when the temperature of a portion close to the first heater 32 is locally high, the heat at the portion is distributed on the whole heat insulating cover 37, so that a locally high temperature does not act on the heat insulating cover 37. Therefore, the durability of the heat insulating cover 37 is enhanced and the heat insulating effect is also improved. In addition, since the gap 40 is provided between the heat insulating cover 37 and the heat transfer cover 30, the heat insulating effect is further improved by the gap. However, the heat insulating cover 37 may be provided in contact with the heat transfer cover 30 in a covering manner.

Further, when the heat insulating cover 37 is formed of fluoric rubber, it is not only excellent in thermal resistance but also it can prevent harmful gas such as polysiloxane gas from occurring. A heat insulating property equal to or more than that of silicon rubber can be achieved, and the heat insulating property can further be improved when fluoric rubber foam is used.

Also, the second heating mechanism 6 is attached to the valve member 13. That is, one or more second heaters 42 are attachably/detachable attached to a portion of a front face of this valve member 13 which is positioned in an internal hole of the valve seat 15 at a time of valve closing to face the flow path 14 by means of a screw 41, and a heater cover 43 which covers the second heaters 42 is attachably/detachably attached by means of screws 44. As the second heater 42, one in which a heat generating body is accommodated in a disc-like, annular or spiral outer skin is used suitably, but its outer shape may be a straight rod shape or an arc shape. Also, a temperature sensor may be built in the second heater 42.

A lead wire 45 from the second heater 42 passes through the valve member 13, the heat transfer body 50 and the partition wall 17 to extend in the interior of the heat insulating portion 4 and it is derived from a hole 47 in a side face of the heat insulating portion 4 to the outside. In this case, it is preferable that the lead wire 45 is flexed in the interior of the heat insulating portion 4 or it is formed in a coil shape as illustrated so as not to interfere with opening/closing operation of the valve member 13. Also, in case that the second heater 42 accommodates a temperature sensor therein, a lead wire of this temperature sensor may be derived to the outside together with the lead wire 45 of the second heater 42 or separately therewith. In this manner, in case that a hole which allows the lead wire 45 from the second heater 42 to pass through is provided in the valve member 13, there occurs a possibility that air-tightness between a surface and a back surface of the valve member 13 is injured. However, since the heater cover 43 is attached to the front face of the valve member 13 so as to cover the hole and the second heater 42 air-tightly, the second heater 42 is protected so as not to react with reaction gas and the air-tightness between the surface and the back face of the valve member 13 is maintained in an excellent state by the heater cover 43.

Thus, the second heater 42 is attached to a portion of the front face of the valve member 13 which comes in contact with reaction gas and the face coming in contact with this gas is directly heated, so that adhesion of by-product due to condensation of reaction gas or the like is securely prevented. In addition, since the second heater 42 is attached to the front face of the valve member 13, when the replacement of the second heaters 42 is performed due to malfunction, change in calorific valve or the like, the replacement work can easily be transferred by detaching the heater cover 43.

Further, the third heating mechanism 7 is provided with the heat transfer body 50 disposed along the rod 16 in the bellows 18 in the interior of the valve casing 10 and one or more third heater 51 which is built in the heat transfer body 50. The heat transfer body 50 is formed of metal material which is excellent in heat conductivity, such as aluminum, in a cylindrical shape and arranged concentrically with the rod 16 while a fine gap is maintained about the rod 16, and the body is fixedly arranged at a fixed position in the valve casing 10 by fixing a proximal end portion thereof to the partition wall 17 by means of a bolt. One or more heater holes 52 are formed in the thickness of the heat transfer body 50 in parallel with a center axial line of the heat transfer body 50, and the rod-like third heater 51 is built in the heater hole 52 in parallel with the rod 16. Also, a distal end portion of the heat transfer body 50 is formed as an annular heat transfer face 50a, and this heat transfer face 50a is separated from the valve member 13 advanced to the valve closing position by a fixed distance and does not come in contact therewith, as shown in FIG. 2. However, when the valve member 13 retracts according to a valve opening, as shown in FIG. 1, the heat transfer face comes in contact with an annular heat receiving face 13c on a back face of the valve member 13.

A lead wire 53 from the third heater 51 is derived from a hole 47 in a side wall of the heat insulating portion 4. In this case, the third heater 51 does not displace, it is unnecessary to flex the lead wire 53 or form the lead wire in a coil shape.

The third heating mechanism 7 functions in the following manner. That is, as shown in FIG. 2, while the valve member 13 closes the valve seat 15, the valve member 13 is spaced from the heat transfer body 50 by a fixed distance so that heat from the third heater 51 is not transferred to the heat receiving face 13c via the heat transfer body 50. As shown in FIG. 1, however, when the valve member 13 retract to open the valve seat 15, the heat receiving face 13c of the valve member 13 abuts on the heat transfer face 50a at the distal end of the heat transfer body 50 and heat from the third heater 51 is transferred from the heat transfer body 50 to the valve member 13 to be heated. Thus, when the valve member 13 is opened to come in contact with reaction gas, the valve member 13 is directly heated by the third heater 51, so that the heating is much effective and adhesion of by-product can securely be prevented. Also, even when the interior of the bellows 18 breathes to cause a temperature drop temporarily due to extension/retraction of the bellows 18 according to opening/closing operation of the valve member 13, the interior of the bellows 18 is always heated by the third heater 51 via the heat transfer body 50, so that the range of temperature drop is suppressed to be very small and it becomes possible to heat the valve member 13 to a high temperature.

The slight gap for allowing a relative displacement between the heat transfer body 50 and the rod 16 is interposed therebetween. However, in case that it is intended to conduct much heat from the third heater 51 from the heat transfer body 50 to the valve member 13 via the rod 16, such a constitution can be employed that the gap is made as small as possible and simultaneously the rod 16 is formed of material which is excellent in heat conductivity, such as aluminum. On the contrary, in order to make it hard that heat from the third heater 51 conducts to the rod 16 via the heat transfer body 50, the gap may be made as large as possible, the rod 16 may be formed of material which has a large heat transfer resistance, such as ceramics, or the both may be implemented.

Incidentally, heat which has transferred from the second heater 42 and the third heater 51 to the rod 16 also conducts from the rod 16 to the piston 21 side. However, most of the heat is isolated and it is hardly transferred to the piston 21 because it is radiated at the heat insulating portion 4 so that there is no possibility that the sealing member 22 is deteriorated due to the heat. However, as a method for preventing heat of the rod 16 from transfer to the piston 21 securely, such a constitution can be employed that the rod 16 is partitioned into a portion positioned on the valve member 13 side and a portion positioned on the piston side 21 side and the position on the piston 21 side is formed of material which has a large heat transfer resistance.

Incidentally, the heat insulating portion 4 is formed with a cylindrical heat insulating member 4a having a plurality of vent holes 47, the heat insulating member 4a is disposed between the valve casing 10 and the cylinder 20 so as to surround the rod 16 concentrically therewith, and the rod 16 is cooled by air flowing in the interior of the heat insulating member 4a.

FIG. 4 shows a second embodiment of the present invention, and the poppet valve 1A of the first embodiment is one of a double acting type but a poppet valve 1B of this second embodiment is a poppet valve of a normal closed type where the valve member 13 is put in a valve closing position at a time of non-operation and of a single acting type where a valve-opening operation is performed by fluid pressure. That is, in the poppet valve 1B, a pressure chamber 24 is formed only on the side of a front face of a piston 21 in the interior of the cylinder 20, and one operation port 25 communicating with the pressure chamber 24 is formed on a side face of the cylinder 20. Then, a spring chamber 56 is formed on the side of a back face of the piston 21, and a coil-like return spring 57 is provided in the spring chamber 56 so as to always bias the piston 21 in a direction of valve opening. In the figure, reference numeral 56a denotes a breather hole for releasing the spring chamber 56 to the outside air.

Accordingly, when pressure fluid is not supplied to the pressure chamber 24, the valve member 13 is pressed on the valve seat 15 by a biasing force of the return spring 57 to close the valve. Then, when fluid pressure is supplied from the operation port 25 to the pressure chamber 24, the piston 21 retracts against a biasing force of the return spring 57, so that the valve member 13 separates from the valve seat 15 to open the valve.

Since constitutions other than the above constitution of the second embodiment are the same as those in the first embodiment, main same constituent portions therein are attached with same reference numerals in the first embodiment, and explanation thereof will be omitted.

Incidentally, in case that a poppet valve of a normal opened type is formed, such a constitution can be employed in contrast with the case of the cylinder operation portion 3 in the poppet valve 1B in FIG. 4 that the pressure chamber 24 is formed on the side of a back face of the piston 21 and the spring chamber 56 is formed on the front face side of the piston 21, and the return spring 57 is provided in the spring chamber 56 so as to always bias the piston 21 in a direction of valve opening.

FIG. 5 shows a third embodiment of the present invention, and a point that a poppet valve 1C of the third embodiment differs from the poppet valve 1A of the first embodiment is a point that the poppet valve 1C does not have a third heating mechanism 7. Also, a second heater 42 where a heat generating body divided into two parts is built is provided in a second heating mechanism 6, lead wires 45a, 45b extending from these heat generating bodies pass through a rod guide 60 extending from a partition wall 17 individually to extend in a heat insulating portion 4 and they are derived therefrom. Since constitutions other than the above are substantially the same as those in the first embodiment, main same constitution portions therein are attached with same reference numerals in the first embodiment and explanation thereof will be omitted.

Even in a case of providing only the first heating mechanism 5 and the second heating mechanism 6, as this poppet valve IC, since the valve casing 10 and the valve member 13 is efficiently heated by these heating mechanisms 5, 6, adhesion of by-product is securely prevented.

FIG. 6 shows a fourth embodiment of the present invention. This poppet valve 1D is a poppet valve of a normal closed type having the first heating mechanism 5 and the second heating mechanism 6, but it does not have the third heating mechanism 7 and the heat insulating portion 4 like the second embodiment. In the poppet valve 1D, the rod 16 is formed in a hollow shape. A cylindrical spring guide 63 is attached near to a distal end portion of this rod 16, a spring seat 64 is attached at a distal end portion of the spring guide 63, and first and second return springs 66a, 66b which always bias the valve member 13 in a direction of valve opening are provided inside and outside in a double manner within the bellows 18 between the spring seat 64 and a partition wall 65 positioned at a bottom portion of the cylinder 20.

Also, a pressure chamber 24 is formed in the interior of the cylinder 20 at a side of a front face of the piston 21 and one operation port 25 communicating with the pressure chamber 24 is formed on a side face of the cylinder 20, a lead wire receiving chamber 69 is formed at the side of a back face of the piston 21 by two partition walls 68a, 68b, and a portion 45c of a lead wire 45 extending from the second heater 42 of the second heating mechanism 6, which is formed in a coil shape or in a flexed state is received in the receiving chamber 69. After this lead wire 45 is inserted into the hollow portion 16a of the rod 16 to penetrate one partition plate 68a from the breather chamber 71 positioned on the back face of the piston 21 and introduced into the receiving chamber 69, it penetrates the other partition plate 68b to be derived to the outside. In the figure, reference numeral 72 denotes a bush for protecting a lead wire. Also, the embodiment where the temperature sensor 34 is attached to the side of the heat transfer cover 30 without accommodating the sensor in the first heater 32 is shown.

In this fourth embodiment, while pressure fluid is not supplied to the pressure chamber 24, the valve member 13 is pressed on the valve seat 15 by biasing forces of the two return springs 66a, 66b so that the valve is put in a closed state. When pressure fluid is supplied to the pressure chamber 24 via the operation port 25, the piston 21 retracts against the biasing forces of the return springs 66a, 66b, so that the valve member 13 is separated from the valve seat 15 to open the valve.

Since constitutions other than the above constitutions of the fourth embodiment are substantially the same as those of the second embodiment, main same constituent portions therein are attached with same reference numerals in the second embodiment and explanation thereof will be explained.

Incidentally, in the respective embodiments, the poppet valves provided with the first to third heating mechanisms 5 to 7 and the poppet valves provided with the first and second heating mechanisms 5 and 6 have been shown, but a poppet valve provided with the first and third heating mechanisms 5 and 7 may be constituted. For example, in the first and second embodiments, such a poppet valve can be obtained by omitting the second heating mechanism 6 provided in the valve member 13 additionally.

Also, the shape of the valve casing 10 is not limited to a square column, and it may be a cylindrical shape or anther shape. In such a case, it is a matter of course that the heat transfer cover 30 or the heat insulating cover 37 in the first heating mechanism 5 are formed so as to conform with these shapes of the valve casing.

Thus, according to the poppet valve of the present invention, since the heat transfer cover is attached to the outer peripheral face of the valve casing in a covering manner and the rod-like first heater is built in the heat transfer cover, heat from the first heater is uniformly distributed and transferred to the whole outer peripheral face of the valve casing through the heat transfer cover. As a result, the whole outer peripheral face of the valve casing can be heated by the inexpensive rod-like heater via the heat transfer cover efficiently and securely.

What is claimed is:

1. A poppet valve with a heater, comprising:
   a valve casing which has a first main port and a second main port, a flow path connecting both the main ports and an annular valve seat provided in the flow path;
   a cylinder which is coupled to the valve casing;
   a valve member of a poppet type which is provided inside the valve casing to open/close the valve seat;
   a rod whose distal end portion is coupled to the valve member and whose proximal end portion extends into the interior of the cylinder;
   a piston which is slidably arranged in the interior of the cylinder and is coupled to the proximal end of the rod;
   a heat transfer cover which is made of heat transfer material and which covers an outer peripheral face of the valve casing so as to surround the whole valve casing; and
   one or more first heaters formed in a rod shape, which are built in the heat transfer cover.

2. A poppet valve according to claim 1, wherein the heat transfer cover is made of aluminum.

3. A poppet valve according to claim 1, wherein a heat insulating cover is provided on an outer surface of the heat transfer cover in a covering manner.

4. A poppet valve according to claim 3, wherein the heat insulating cover is formed by attaching a heat dispersing plate for dispersing heat from the heat transfer cover on an inner surface of the heat insulating plate, and the heat insulating cover is attached to the heat transfer cover while a constant gap is maintained between the heat insulating cover and the heat transfer plate by interposition of a spacer.

5. A poppet valve according to claim 4, wherein the heat insulating plate is made of fluoric rubber or fluoric rubber foam.

6. A poppet valve according to claim 1, wherein the valve member has one or more second heaters, the second heaters are attached to a portion of a front face of the valve member which is positioned in an internal hole of the valve seat to face the flow path at a time of valve closing and the second heaters are covered with a heater cover air-tightly.

7. A poppet valve according to claim 1, wherein a heat transfer body which is provided at its distal end with a heat transfer face with which the valve member comes in contact at a position of valve opening is disposed in the interior of the valve casing, and one or more third heater is attached to the heat transfer body.

8. A poppet valve according to claim 7, wherein the heat transfer body is formed in a cylindrical shape and disposed around the rod concentrically therewith, and the third heater is accommodated in a heater hole provided in the heat transfer body.

9. A poppet valve according to claim 1, wherein the valve casing and the cylinder are coupled to each other via a heat insulating portion for preventing heat from transfer from the valve casing to the cylinder.

10. A poppet valve with a heater, comprising:
    a valve casing which has a first main port and a second main port, a flow path connecting both the main ports and an annular valve seat provided in the flow path;
    a cylinder which is coupled to the valve casing;
    a valve member of a poppet type which is provided inside the valve casing to open/close the valve seat;
    a rod whose distal end portion is coupled to the valve member and whose proximal end portion extends into the interior of the cylinder;
    a piston which is slidably arranged in the interior of the cylinder and is coupled to the proximal end of the rod;
    a heat transfer cover which is made of heat transfer material and which covers an outer peripheral face of the valve casing so as to substantially surround the whole valve casing;
    one or more first heaters formed in a rod shape, which are inserted into heater holes formed in a thicker portion of the heat transfer cover; and
    a heat insulating cover which has a constitution where a heat diffusing plate for diffusing heat has been attached on an inner face of a heat insulating plate, and which is attached to an outside of the heat transfer cover while a constant space is maintained between the heat insulating cover and the heat transfer cover via a spacer.

11. A poppet valve according to claim 10, wherein the valve member has one or more second heaters, the second heaters are attached to a portion of a front face of the valve member which is positioned in an internal hole of the valve seat to face the flow path at a time of valve closing and the second heaters are covered with a heater cover air-tightly; and
    a cylindrical heat transfer body provided at its distal end with a heat transfer face with which the valve member comes in contact at a valve opening position is disposed in the interior of the valve casing about the rod concentrically therewith, and one or more third heaters are attached in heater holes provided in the heat transfer body.

12. A poppet valve according to claim 10, wherein the valve casing and the cylinder are coupled to each other via a heat insulating portion for preventing heat from transfer from the valve casing to the cylinder.

* * * * *